June 20, 1939.  G. A. LYON  2,163,005
PROCESS OF MANUFACTURING SHEET METAL ARTICLES
Filed Aug. 3, 1936  6 Sheets-Sheet 1
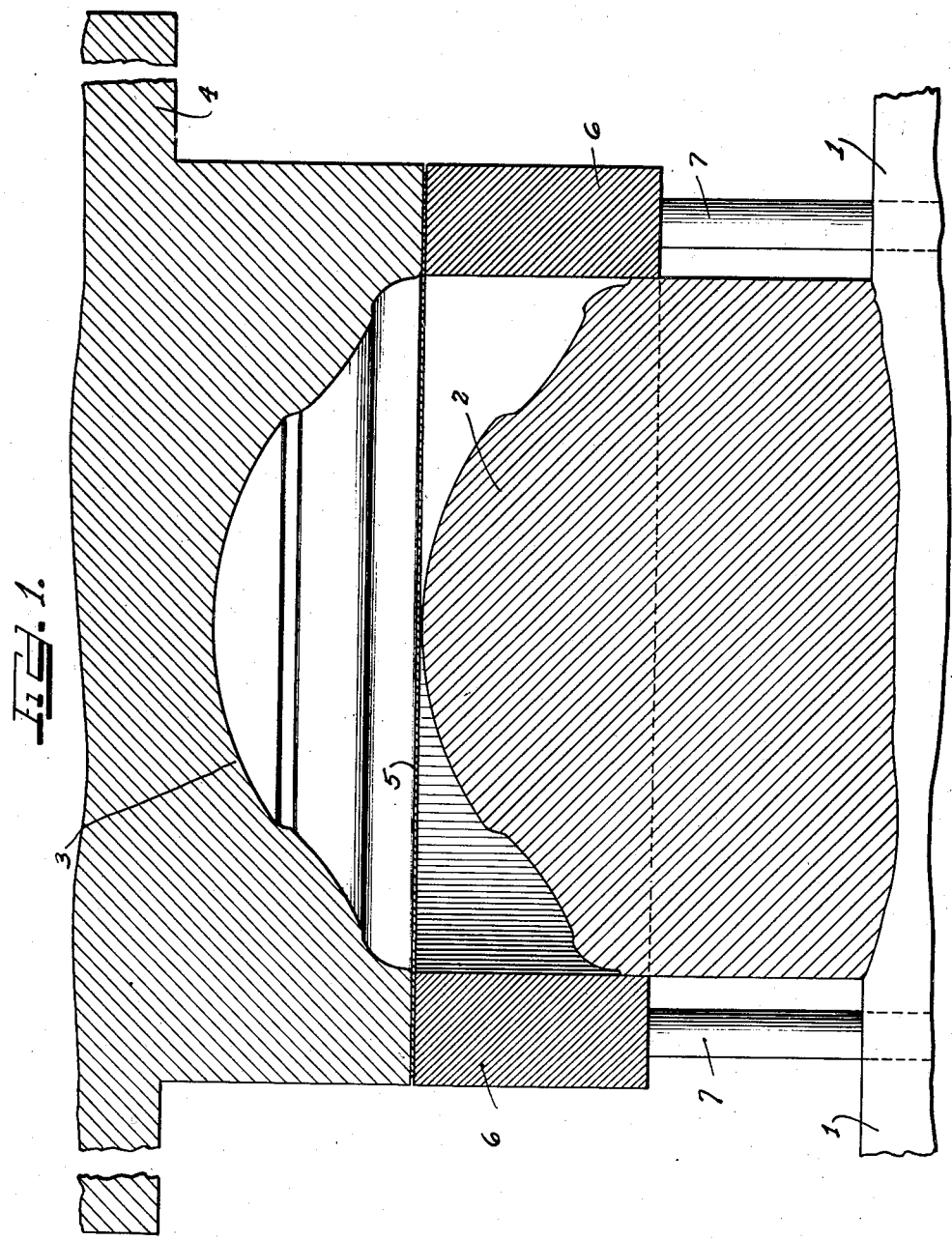
Inventor
GEORGE ALBERT LYON.

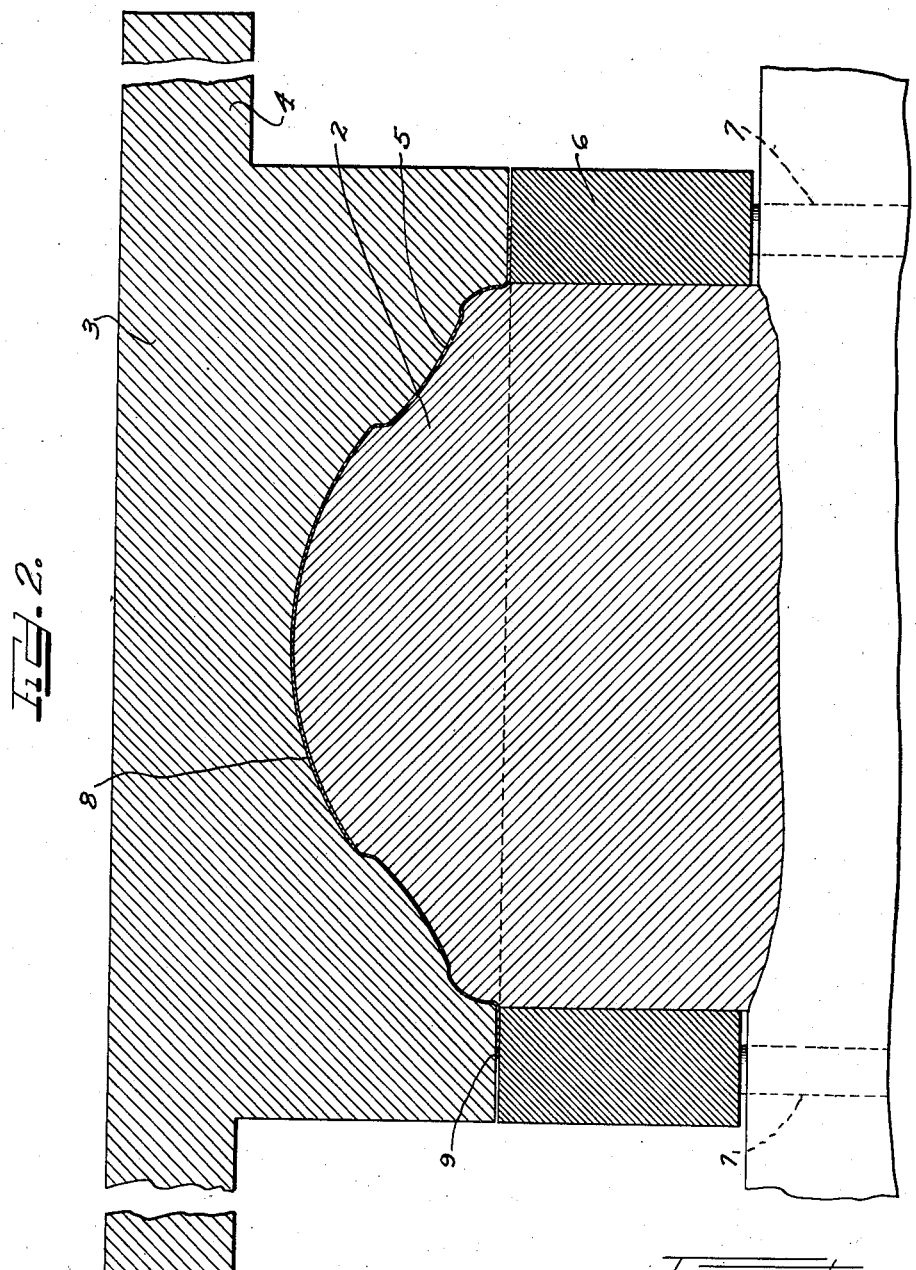

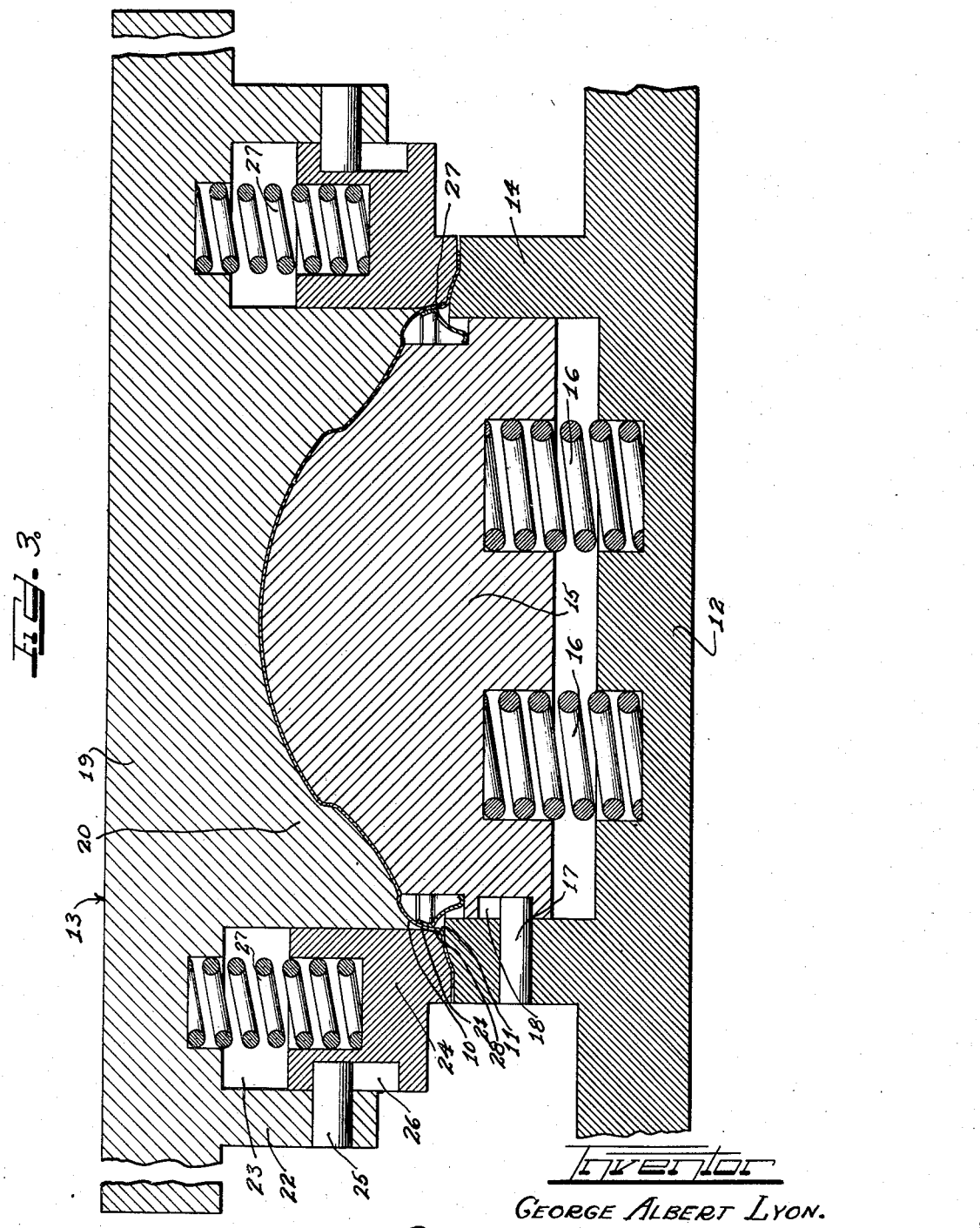

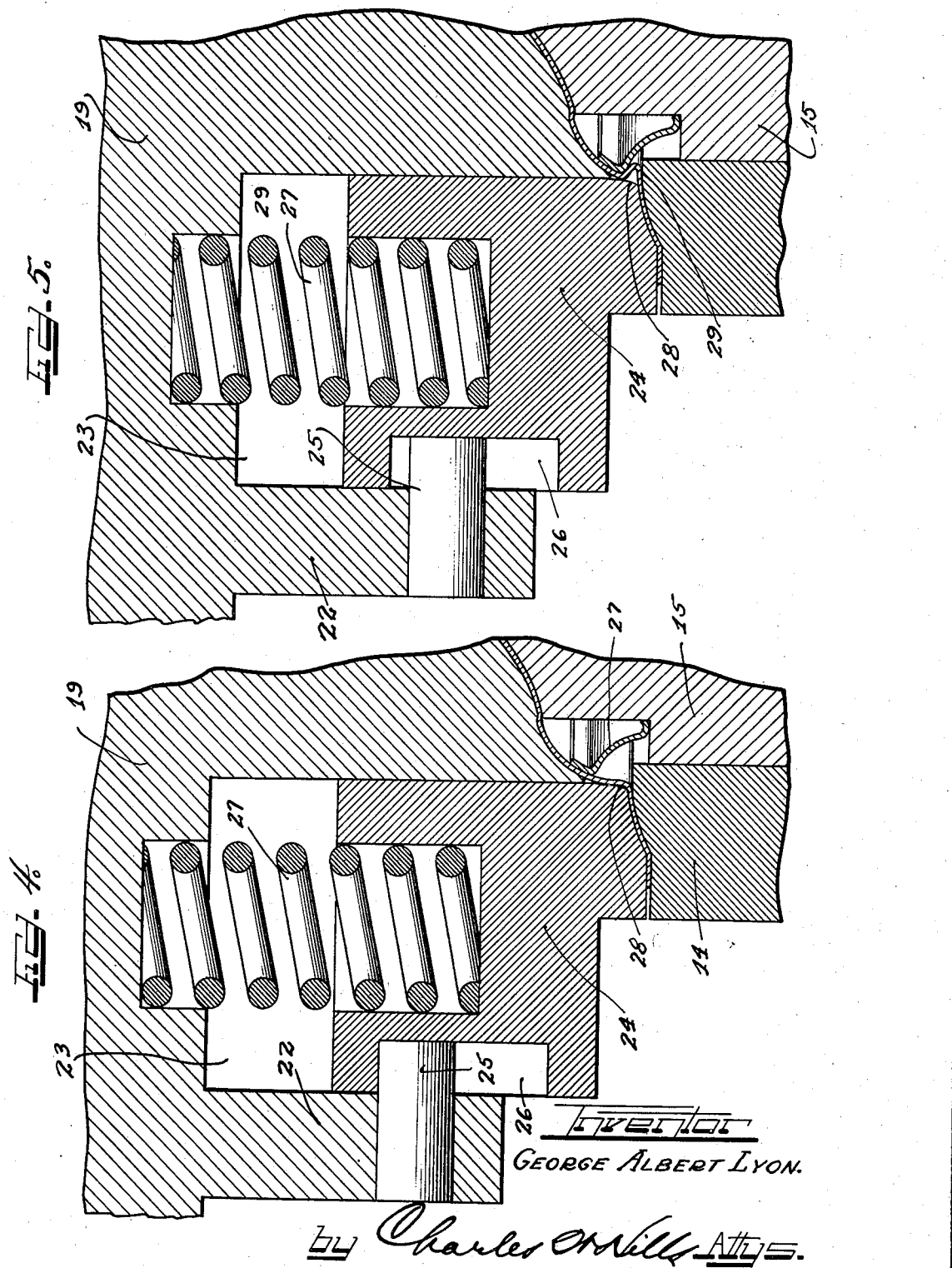

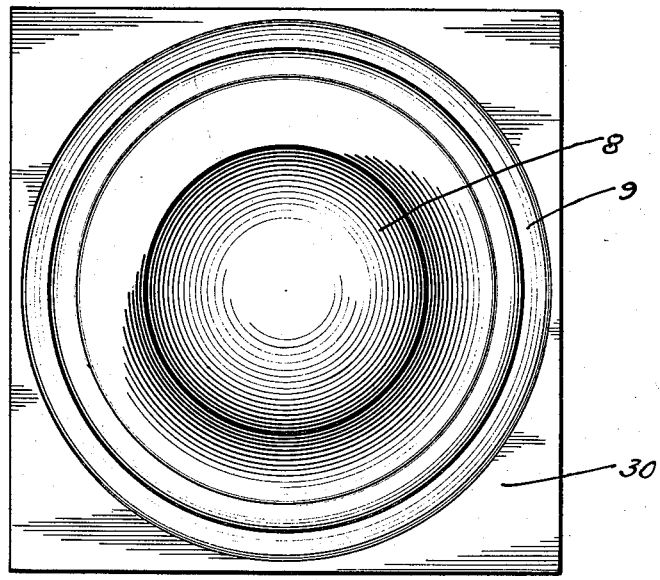
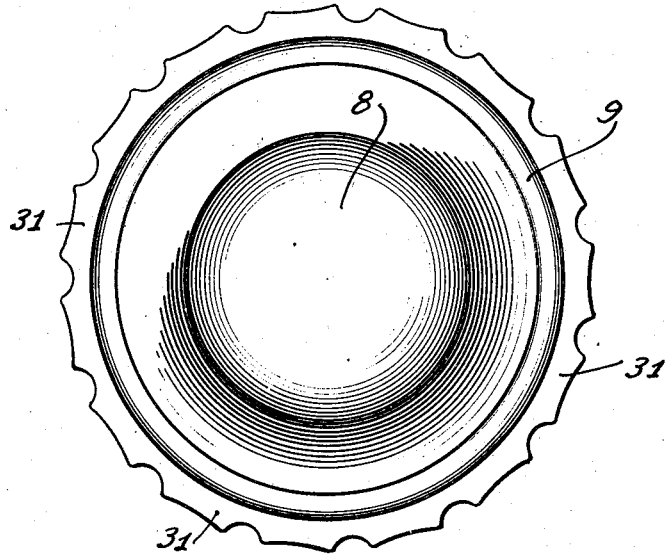

June 20, 1939.　　　　　G. A. LYON　　　　　2,163,005
PROCESS OF MANUFACTURING SHEET METAL ARTICLES
Filed Aug. 3, 1936　　　6 Sheets-Sheet 6
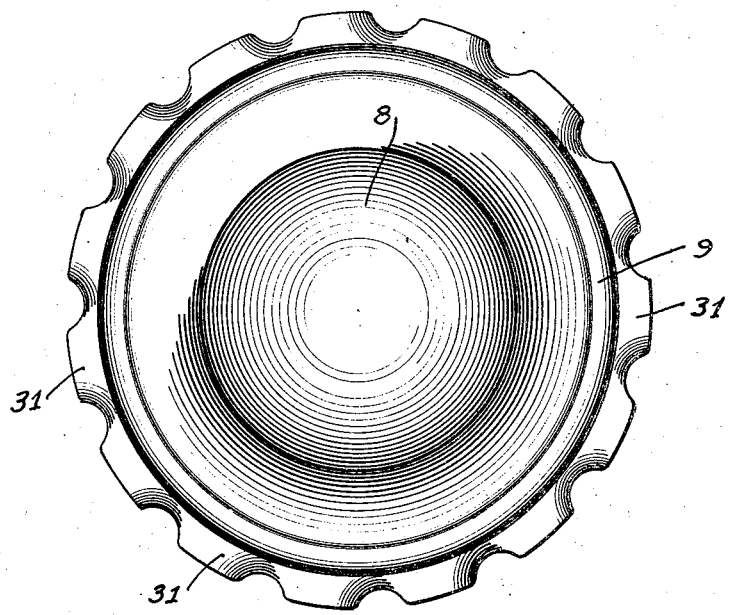
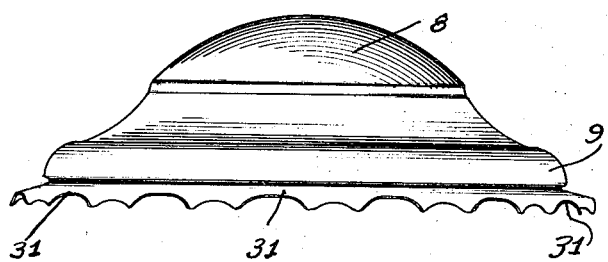
Inventor
GEORGE ALBERT LYON.

Patented June 20, 1939

2,163,005

UNITED STATES PATENT OFFICE 2,163,005

PROCESS OF MANUFACTURING SHEET METAL ARTICLES

George Albert Lyon, Allenhurst, N. J.

Application August 3, 1936, Serial No. 93,932

6 Claims. (Cl. 113—116)

This invention relates to a process for manufacturing sheet metal articles, and more particularly to the manufacture of sheet metal articles which are adapted for disposition over the outer surfaces of wheels.

In the manufacture of sheet metal articles, many things contribute to high manufacturing costs. It is sufficient to state that simplicity of die parts, elimination of waste material insofar as possible, and as few manufacturing steps or operations as possible is the goal which all manufacturing engineers seek to attain.

It is an object of this invention to provide a novel process for manufacturing sheet metal articles, which greatly reduces manufacturing costs.

It is a further object of this invention to provide a novel process for manufacturing and finishing the surface of sheet metal articles having a dome shaped central portion and an outer portion.

It is a still further object of this invention to provide a novel process for shaping a portion of a sheet metal article and by the same pressing operation causing a second portion of the article to be collapsed into an annular bead.

Another and further object of this invention is to provide a novel process for manufacturing wheel discs which includes a preliminary stamping operation, an intermediate polishing operation, a second stamping or shaping operation and a final polishing or finishing operation.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

Figure 1 is a cross-sectional view showing a portion of a die press, with a sheet of material in it, prior to the stamping operation which constitutes the first step of my novel process;

Figure 2 is a cross-sectional elevational view of the portion of the die press shown in Figure 1 after the first stamping operation has been completed;

Figure 3 is an elevational view partly in cross section of a portion of a second die press which is in the act of performing the second step of the process;

Figure 4 is an enlarged fragmentary view of the left-hand portion of Figure 3;

Figure 5 is an enlarged fragmentary view showing the elements of Figure 4 but in their position at the end of the pressing operation in the second die press;

Figure 6 is a plan view of the article after it has been removed from the second die press;

Figure 7 is a plan view of the article after the waste material has been severed from the article shown in Figure 6;

Figure 8 is a plan view of the finished article; and

Figure 9 is an elevational view of the finished article.

Referring now to Figure 1 of the drawings, the die press by which the first step of the process may be effected includes in general a bed 1, a male die member 2 supported on bed 1 and an upper or female die member 3 carried by the movable member 4 of the die press. The metallic sheet 5 from which the article is to be formed is supported on an annular hold-down member 6. Annular member 6 is supported on a plurality of upright pistons 7 which in turn are carried on an air cushion in the bed 1 of the die press. When the female or movable die member 3 is lowered into the position shown in Figure 1, the metallic sheet 5 is firmly held in place by the cooperation of annular hold-down member 6 with female die 3.

Axial pressure is then applied to female die member 3 by the press causing this member to move down into the position shown in Figure 2, thereby stamping a dome shaped central portion 8 in metallic sheet 5. Outer portion 9 remains unshaped during this step of the process as is indicated in Figure 2 of the drawings. As may be observed from the drawings, annular hold-down portion 6 has moved downwardly against the compressive action of the air cushion (not shown) in bed 1, its function merely being to secure firmly the outer portion 9 of metallic sheet 5 in the press.

The second step of the process involves a preliminary shaping operation on the outer portion of the article and a collapsing of an intermediate portion of the article into an annular bead. This step of the process may be accomplished by a single operation in a die press such for example as that illustrated in Figure 3 of the drawings. Before describing the die press illustrated in Figure 3, note should be taken of the shape of that portion of the article which is indicated by the reference numeral 10. As may be seen, this part is arcuate in cross-section and where it joins the outer portion 9, it is slightly indented inwardly at 11. That portion of part 10 which lies immediately above the indentation 11 is substantially straight for a short distance. Of course, details of such configuration may be varied. The form illustrated shows a satisfactory formation for the purposes intended, and is herein set forth as a specific example. With such a construction, when pressure is applied to the dome shaped central portion, with the outer portion 9 held firmly in position, the part 10 will collapse inwardly in the region of the indentation 11 due to the preformed shape of this part.

As illustrated in Figure 3, the apparatus for forming the second step of the process includes in general a die block 12 and a punch die 13. By any suitable means, such as a punch press, these respective die parts 12 and 13 may be brought together in a well known manner. It is preferable, however, that the die block 12 be held in fixed position, and the punch or top die 13 be moved relatively thereto.

The lower die part includes an upstanding die ring 14 which defines an inner hollow cavity for the reception of a reciprocal die pad 15. This pad is normally urged outwardly relative to the ring 14 by any suitable pressure means, such for example as by spring 16 positioned in confronting cavities in the pad 15 and the die part 12. The outward movement of the pad is limited by one or more pins or studs 17 fixed in the ring die 14, each with its free end projecting into a notch or recess 18 in die pad 15.

The upper face of die ring 14 is shaped to provide the desired configuration for the outer portion 9 of the article, at this stage of the process. The outer face of the pad 15 is shaped to intimately fit the inner face of the dome shaped central part of the article out to the arcuate part 10.

The upper or punch die 13 includes a base portion 19 and an integral central projecting portion 20 faced to intimately overlie the dome shaped part of the article. This facing preferably is designed to intimately contact the outer surface of the article including the upper portion of the arcuate part 10, the die part terminating at an intermediate portion of the arcuate part 10 as indicated at 21, but extending radially outwardly beyond the pad 15. Base portion 19 is also provided with an integral annular depending flange 22 which defines an annular recess 23 between itself and die part 20. In recess 23, an annular die member 24 is slidably mounted and held in position by the engagement of a plurality of pins 25 with a corresponding number of recesses 26. Pins 25 are firmly secured to the depending flange 22 and the recesses 26 occur at like intervals in the die member 24, whereby reciprocal movement of die member 24 is limited in each direction. A plurality of springs 27, suitably seated in recesses in the base portion 19 and the reciprocal die member 24, normally tend to urge the die member outwardly beyond the central part 20. The face of die member 24 is shaped complementally to the face of die ring 14 so that when application of pressure therebetween the outer portion 9 of the article assumes its desired preliminary shape.

An interior skirt which is adapted to be secured to the article by the collapsing of the annular bead is illustrated at 27. Skirt 27 may assume any desired configuration, but that illustrated in the drawings has been found particularly applicable as an ornamental article holding flange.

As may be seen best in Figure 4 of the drawings, die member 24 is provided preferably with an outwardly inclined or tapered inner wall 28 adjacent the arcuate part 10 of the article. This wall 28, while outwardly inclined with respect to the axis of the punch die, is curved preferably so as to be slightly convex. It should be understood that the wall portion 28 may be slightly varied in shape depending upon the point at which it is deemed best to have the arcuate part 10 of the article contact the same. It is to be noted, however, that this wall need not of necessity be more than slightly out of alignment from the vertical wall portion thereabove.

The relative position of the various elements of the punch press before and after the collapsing operation may be seen best in Figures 4 and 5 of the drawings which show only the left-hand portion of the punch press illustrated in Figure 3. More particularly, in Figure 4, the article is shown in the press after the upper punch die 13 has been moved downwardly sufficiently to cause cooperating die members 14 and 24 to shape the outer portion 9 of the article as indicated. Upon continued axially downward movement of the upper die member, the metal in the article at the indent 11 begins to collapse inwardly. Since further movement of die element 24 is prevented by die ring 14, die member 24 begins to compress ring 27 thus bringing the die member 24 closer to the base part 19 of the upper die. At the end of the downward movement of the upper die member, the indented portion 11 has been collapsed into a circular bead as is illustrated at 29 in Figure 5 of the drawings. It should be noted that during this second step of the process, the original shape of the dome shaped central part of the article is maintained by die part 20 and die pad 15. It should also be noted that the extent of the collapse, or in other words, the depth of bead 29 may be regulated very effectively by the distance which the upper die member is permitted to move.

From the above description, it will be apparent that the second step of the process has been effected in an extremely economical yet reliable manner. By a single pressing operation in a die press, the outer portion of the article is stamped or shaped to its desired preliminary configuration and an annular bead is collapsed from the article to firmly secure an interior skirt thereto.

The third step of the process is a polishing or finishing of the surface of the outer portion of the article. It has been found that the polishing of the outer portion of the article at this stage of the process is extremely advantageous. Inasmuch as the article is stamped from a sheet of metal from which there is very little waste and furthermore since the outer portion of the article itself is used as the hold-down portion during the first step of the process which forms the dome shaped central portion of the article, it has been found highly desirable to polish a portion of the article at this time by holding or clamping it in suitable apparatus by the unfinished portion of the article. That is to say, the article at this stage of the process may be held by the central dome-shaped portion or by the slight portion of scrap which is still on the article or by both while the outer portion of the article is polished. The polishing of the outer portion 9 of the article may be effected in any suitable manner which is well known to those skilled in the art, such for example, as by buffing wheels, rouge wheels or the like. No specific apparatus has been shown in the drawings as illustrating this step of the process, it being believed that this step of the process may readily be understood without an illustration of any specific apparatus.

In Figure 6 of the drawings, the article as it appears at this stage of the process is illustrated showing the central dome shaped portion, the outer portion 9 and the scrap portion 30. The fourth step of the process is a cutting operation which involves the removal of the scrap material 30 remaining on the article. No specific apparatus is illustrated for effecting the removal of the scrap material from the article, it being understood that any suitable cutting apparatus may be used. The article as it appears after this stage of the process is illustrated in Figure 7 of the drawings and includes the dome shaped central portion 8, and the outer portion 9, the outer edge portion 9 being serrated to provide a plurality of fingers 31.

The next step of the process involves bending down the radial edges of fingers 31 as is illustrated in Figures 8 and 9 of the drawings. This bending down of the edges of fingers 31 may be effected in any suitable manner such as in a press. The article as illustrated in Figures 8 and 9 of the drawings is adapted to be disposed over the outer side surface of a vehicle wheel, the fingers 31 being adapted to cooperate with and intimately overlie the spokes of the vehicle wheels (not shown).

The final step of the process is the polishing or finishing of the surface of the dome shaped central portion of the article. If desired this may be given a high lustrous finish similar to that given the outer portion 9 in the intermediate polishing step of the process by any suitable polishing means, such for example, as by a buffing wheel or by a rouge wheel or the like. On the other hand, it may be painted in any suitable color to provide a contrasting effect with the outer portion 9 of the article.

From the above description it will readily be understood that I have provided an extremely simple and economical process for manufacturing ornamental articles and particularly ornamental articles of the type which are adapted to be disposed over the outer side surface of vehicle wheels. The amount of waste material has been greatly reduced by using the outer portion of the article itself as the hold-down portion during the preliminary stamping of the dome shaped central portion of the article. Polishing the outer portion of the article at an intermediate stage of the process, as described, greatly simplifies the apparatus which is necessary for finishing the surface of ornamental articles. As will readily be appreciated, the die press operations described are greatly simplified and improved. Thus the combination of steps which results in my novel process not only minimizes manufacturing costs but also greatly increases the ease with which ornamental articles may be manufactured.

While I have shown a particular embodiment of my invention, it will of course be understood that I do not wish to be limited thereto since many modifications may be made, and I therefore contemplate by the appended claims to cover all such modifications as fall within the true spirit and scope of my invention.

I claim as my invention:

1. In the manufacture of ornamental sheet metal articles adapted for disposition on vehicle wheels, the process which includes stamping an article having a dome shaped central portion and an unshaped outer portion, shaping said outer portion in a die press, and by the same pressing movement of the press applying axial pressure to the central portion to collapse inwardly a portion of the central portion of the article.

2. In the manufacture of ornamental sheet metal articles adapted for disposition on vehicle wheels, the process which includes stamping an article having a dome shaped central portion and an unshaped outer portion, placing said article in a die press and by a single axial movement of the dies of the press causing the outer portion to be deflected into a desired shape and causing an intermediate portion of the article to collapse inwardly into an annular bead.

3. In the manufacture of ornamental sheet metal articles adapted for disposition on vehicle wheels, the process which includes stamping an article having a dome shaped central portion and an unshaped outer portion, and shaping said outer portion and securing an interior skirt to the article by a single pressing operation in the die press.

4. In the manufacture of ornamental sheet metal articles adapted for disposition on vehicle wheels, the process which includes stamping an article having a dome shaped central portion and an unshaped outer portion, shaping said outer portion and securing an interior skirt to the article by a single pressing operation in the die press, polishing said outer portion, further shaping said outer portion to its desired final shape, and then finishing the surface of said central portion.

5. In the manufacture of ornamental sheet metal articles adapted for disposition on vehicle wheels, the process which includes stamping an article having a raised central portion and an unshaped outer portion, shaping said outer portion in a die press, and by the same pressing movement of the press applying axial pressure to the central portion to collapse inwardly a portion of the central portion of the article, polishing said outer portion, further shaping the polished outer portion, and then polishing the outer surface of said raised central portion while holding the outer portion of said article.

6. In the manufacture of ornamental sheet metal articles adapted for disposition on vehicle wheels, the process which includes stamping an article having a shaped central portion and an unshaped outer portion, shaping said outer portion in a die press, and by the same pressing movement of the press applying axial pressure to the central portion to collapse inwardly a portion of the central portion of the article, finishing the surface of one portion of the stamped sheet, further shaping the finished portion, and then finishing the surface of a second portion of the stamped sheet while holding the article by its first finished portion.

GEORGE ALBERT LYON.